United States Patent [19]

Hsech-Pen

[11] Patent Number: 5,195,871
[45] Date of Patent: Mar. 23, 1993

[54] SELF-RESTORED WINDMILL

[76] Inventor: Leu Hsech-Pen, P.O. Box 16-317, Taipei, Taiwan

[21] Appl. No.: 762,910

[22] Filed: Sep. 19, 1991

[51] Int. Cl.⁵ .............................................. F03D 7/04
[52] U.S. Cl. ...................................... 416/12; 416/15; 416/17; 415/4.2; 415/907
[58] Field of Search .................. 416/13, 9, 15, 12, 17; 415/2.1, 4.1, 4.2, 4.4, 905, 907

[56] References Cited

U.S. PATENT DOCUMENTS

| 4,113,408 | 9/1978 | Wurtz et al. | 416/17 |
| 4,186,313 | 1/1980 | Wurtz | 416/17 |
| 4,649,284 | 3/1987 | Hsech-Pen | 416/117 |

FOREIGN PATENT DOCUMENTS 0650805  2/1929  France ..................... 416/9
2396878  3/1979  France ..................... 416/17

Primary Examiner—Edward K. Look
Assistant Examiner—Christopher Verdier

[57] ABSTRACT

A windmill includes a plurality of fan blade units pivotally mounted in a central vertical transmission shaft each unit having a right-leaf vertical fan blade and a left-leaf horizontal fan blade in which the vertical fan blade as rotated to the leeward can be feathered by a forward rotation of a driving motor to reduce its wind resistance during its leftward rotation towards the windward, and the horizontal fan blade when rotated to the windward can be vertically erected ready for receiving wind energy by a reverse rotation of the motor during its rightward rotation towards the leeward for efficiently collecting the wind energy for driving the transmission shaft for power generation.

6 Claims, 6 Drawing Sheets

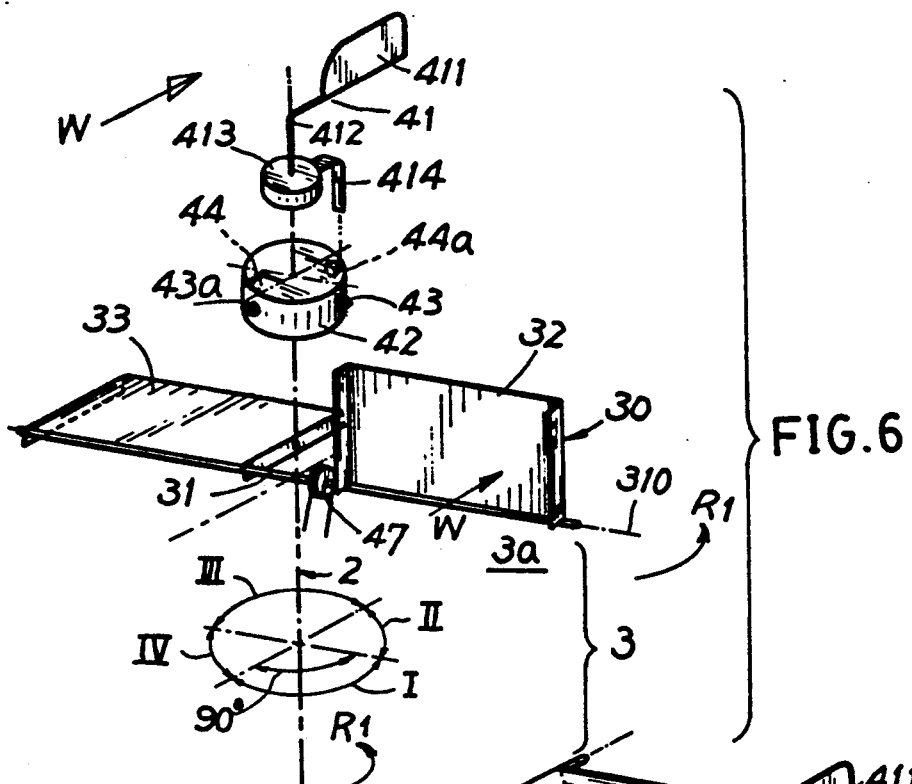
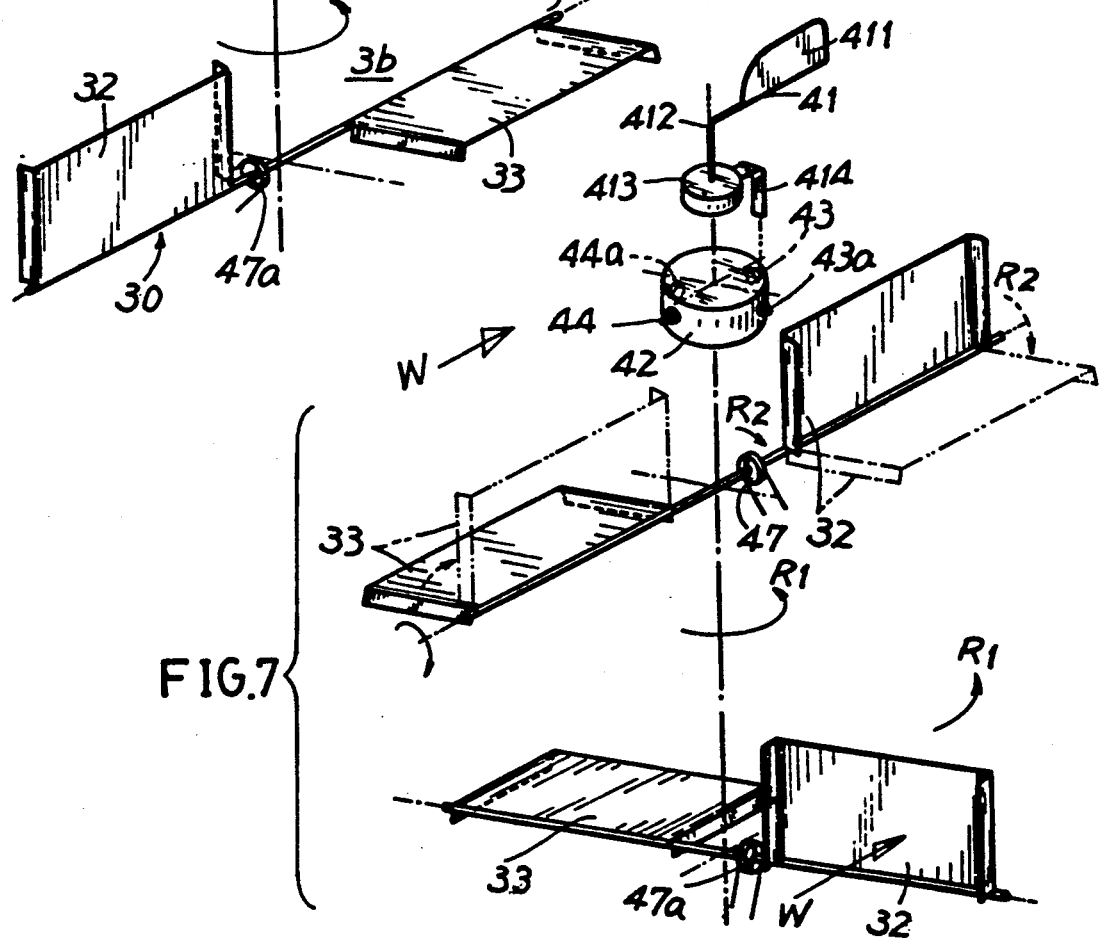

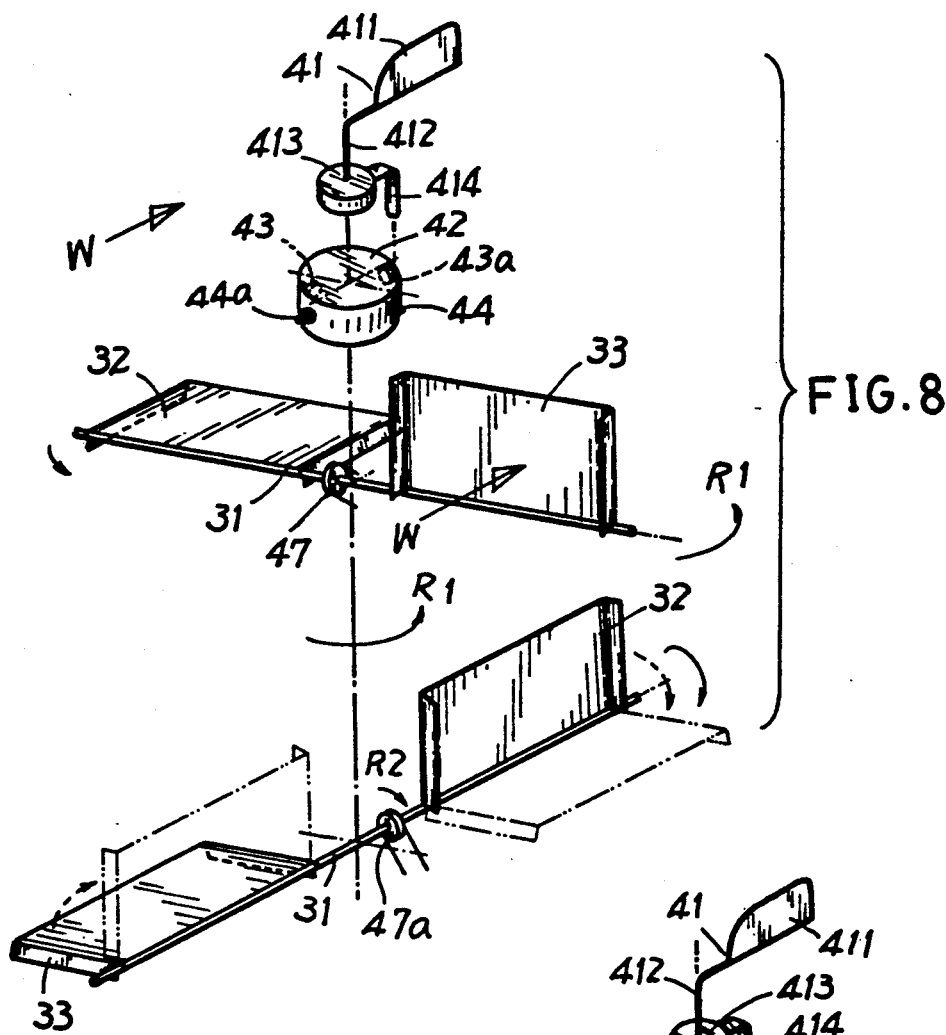
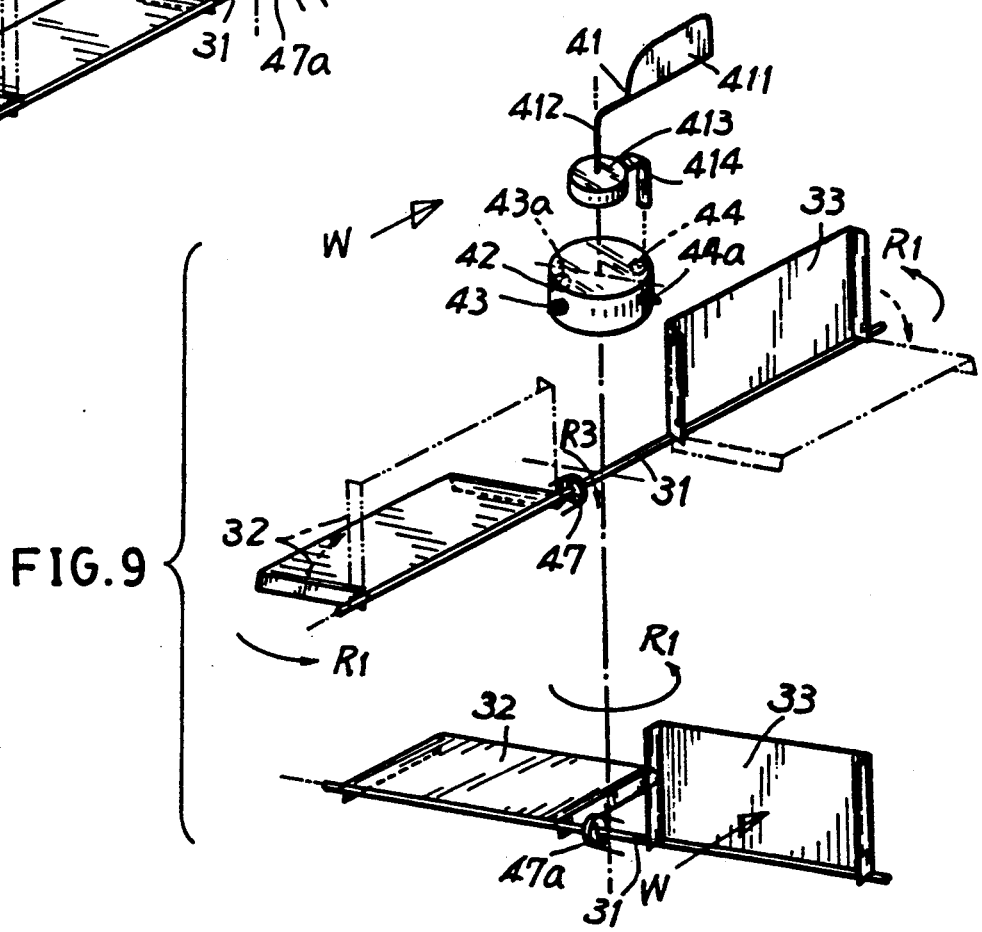

:

SELF-RESTORED WINDMILL

BACKGROUND OF THE INVENTION

A windmill as early disclosed by the same applicant of this invention of U.S. Pat. No. 4,649,284 is shown in FIG. 10 in which the fan blades 3 when rotated to the left side as shown in the figure are expected to be feathered to reduce the wind resistance on the left side. However, when the wind is very strong to exert a great moment of inertia of the blades 3 rotating around a longitudinal axis of the transmission shaft 2, the blades 3 once rotated towards the left side may not be feathered due to the great moment of inertia or the centrifugal force of the rotating blades as shown in dotted lines of FIG. 10, thereby counteracting the wind driving force acting on the right side blades and greatly reducing an output energy of the windmill.

The present invention has found the shortcoming of my early patented windmill and invented the present windmill for automatically restoring the fan blades for always facing the wind force when rotated from windward towards leeward.

SUMMARY OF THE INVENTION

The object of the present invention is to provide a self-restored windmill including a restoring means always rotating a plurality of fan blades on a right side of a central transmission shaft to perpendicularly face the wind direction for efficiently picking up the wind energy, and for enforcing a feathering movement of the blades on a left side of the shaft for reducing the wind resistance of the left-sideblades.

BRIEF DESCRIPTION OF THE DRAWINGS

FIG. 6 is an illustration showing a first operation step of the rotating blades in accordance with the present invention.

FIG. 7 shows a second movement of the blades rotating in 90 degrees from that as shown in FIG. 6.

FIG. 8 shows a third position of the rotating blades following FIG. 7.

FIG. 9 shows a fourth movement of the blades following FIG. 8.

DETAILED DESCRIPTION

Figure 1:
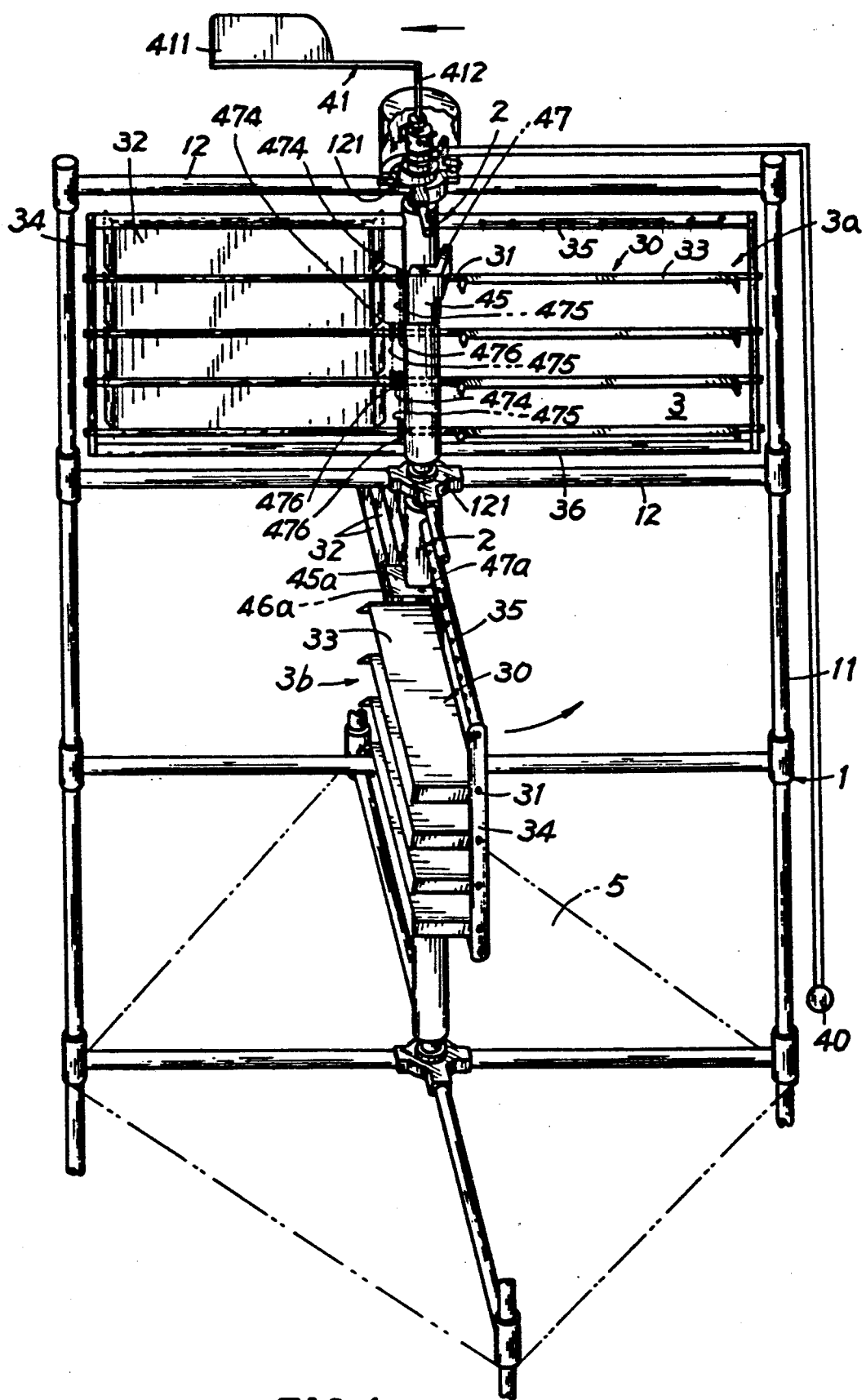
FIG. 1 is a perspective view of the present invention.

As shown in FIGS. 1-9, the present invention comprises: a supporting frame 1, a vertical transmission shaft 2, a fan blade means 3, a wing-receiving restoring means 4, and a power generator 5. The frame 1, the shaft 2, the power generator 5 and the bending edges of all fan blades are similar to that as shown in my earlier U.S. Pat. No. 4,649,284.

The supporting frame 1 includes: four vertical columns 11 and a plurality sets of bracing rod cross 12, each cross 12 being horizontally secured to the four columns 11 and each cross 12 having a central bush 121 for rotatably mounting the vertical transmission shaft 2 therein. The power generator 5 is installed on a lower portion of the windmill and driven by the transmission shaft 2.

Figure 2:
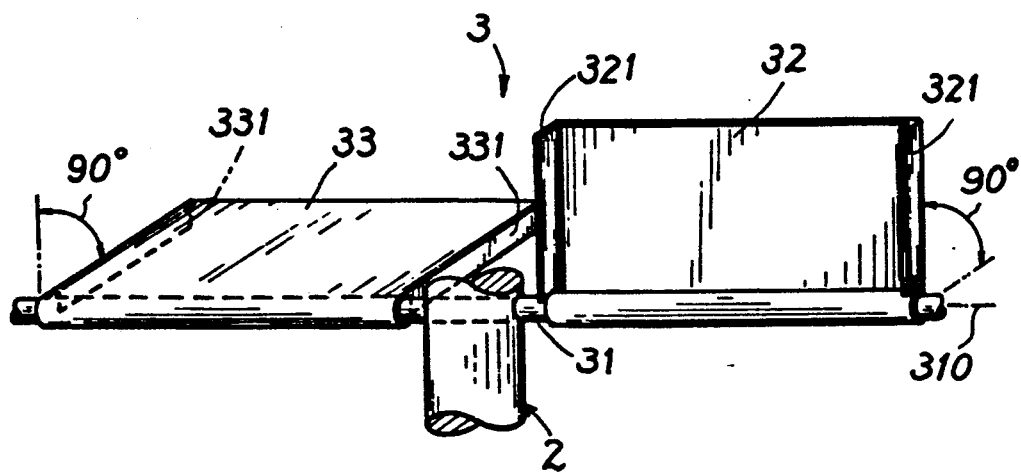
FIG. 2 shows a fan blade unit of the present invention.

The fan blade means 3 includes an upper blade combination 3a and a lower blade combination 3b Each blade combination 3a or 3b includes a plurality of fan blade units 30 each nit 30 having a horizontal blade shaft 31 pivotally mounted in the central vertical transmission shaft 2, a right-leaf vertical fan blade 32 vertically fixed to a right portion of the horizontal shaft 31 on a right side of the shaft 2 and a left-leaf horizontal fan blade 33 horizontally fixed to a left portion of the horizontal shaft 31 on a left side of the shaft 2. Each horizontal shaft 31 has its two opposite ends pivotally secured in two side vertical rods 34 respectively positioned on a right side and a left side of the shaft 2 each rod 34 being fixed between an upper horizontal rod 35 secured on an upper portion of the vertical shaft 2 and a lower horizontal rod 36 secured on a lower portion of the shaft 2. The right-leaf fan blade 32 is projectively perpendicular to the left-leaf fan blades 33 as shown in FIG. 2.

As shown in FIG. 1, all right-leaf fan blades 32 are generally coplanar with one another and all left-leaf fan blades 33 are parallel with one another. Each horizontal shaft 31 of the lower blade combination 3b is projectively perpendicular to each horizontal shaft 31 of the upper blade combination 3a as shown in FIG. 6 so that each fan blade of the lower combination 3b is projectively deviated from that of the upper combination 3a at a right angle or a quadrant. Plural elastomer protrusions are formed on rod 35 or each shaft 31 for the buffer of impact force of each blade when subject to strong wind.

The wind-receiving restoring means 4 includes: a wind-direction tracking means 41; an actuating distributor 42 formed on a top end portion of shaft 2 having a first forward-rotation contactor 43 formed on a right side portion of the distributor projectively aligned with a right side portion of the horizontal shaft 31 securing the right-leaf vertical blade 32 of the upper blade combination 3a, a first reverse-rotation contactor 44 formed on a left side portion of the distributor projectively aligned with a left side portion of the horizontal shaft 31 securing the left-leaf horizontal fan blade 33 of the upper blade combination 3a, a second forward-rotation contactor 43a formed on a front side portion of the distributor separating from the first contactor 43a at a right angle projectively aligned with the right-leaf vertical blade of the lower blade combination 3b and a second reverse-rotation contactor 44a formed on a rear side portion of the distributor opposite to the second forward-rotation contactor 43a; an upper driving motor 45 actuated by the first contactors 43, 44; a lower driving motor 45a actuated by the second contactors 43a, 44a; an upper clutch coupling 46 operatively coupling an upper driving means 47 with the upper motor 45; and a lower clutch coupling 46a operatively coupling a lower driving means 47a and the lower motor 45a.

The wind-direction tracking means 41 includes: a steering tail blade 411 secured to a vertical stem 412, a hollow cylindrical base 413 rotatably mounted on a central protrusion 421 of the distributor 42 having the vertical stem 412 formed on the base 413 and a pusher blade 414 protruding outwardly and downwardly to rotatably actuate the plural contactors 43, 43a, 44, 44a on the distributor 42.

Figure 3:
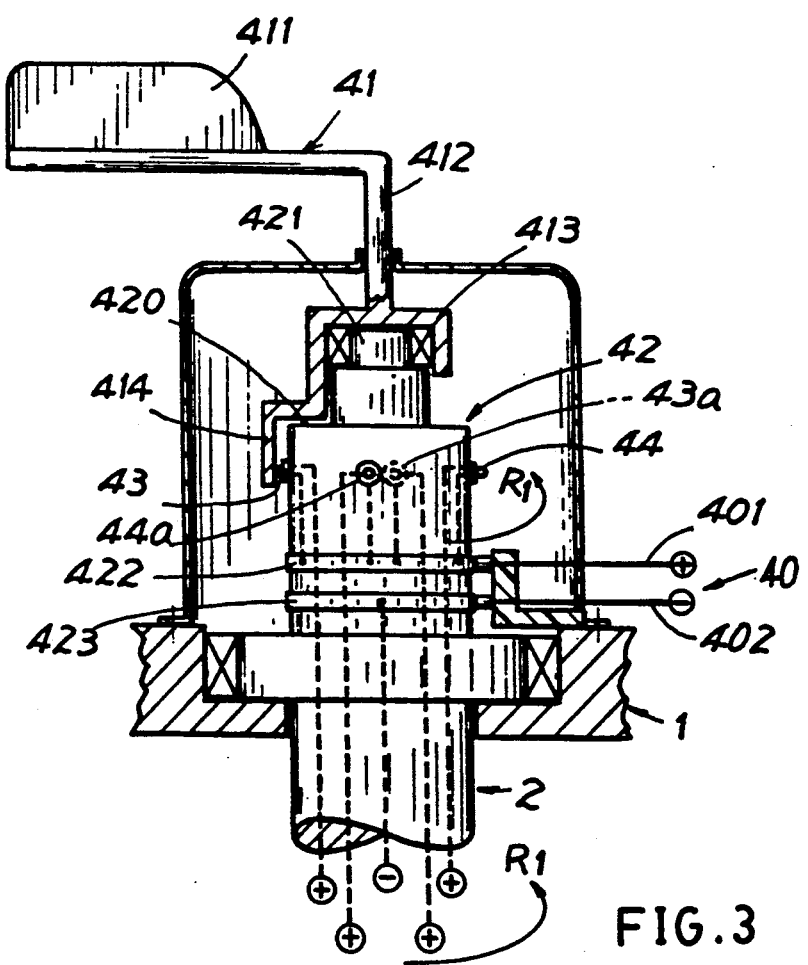
FIG. 3 shows a wind-receiving restoring means of the present invention.

The actuating distributor 42 includes: a central protrusion 421, a cylindrical body 420 formed under the protrusion 421 having the plural contactors 43, 44a, 44, 43a circumferentially formed on the cylindrical body 420 to be operatively depressed by the pusher blade 414 and a negative electric conducive ring 423 annularly disposed around the cylindrical body 420 and respectively powered by a power source 40 having a positive wire 401 and a negative wire 402 as shown in FIG. 3.

The driving motor 45 has a motor shaft 451 operatively coupling an input shaft 461 of the clutch coupling 46. The clutch coupling 46 includes an output shaft 462 electromagnetically coupling the input shaft 461. The output shaft 462 is secured with a first driving gear 471 of the driving means 47 having a first driving chain 472 coupling the first driving gear 471 and a first follower gear 473 secured on a right side of an uppermost horizontal shaft 31 of the fan blade unit 30, and having as second driving gear 474 formed on a left side of an uppermost shaft 31, which is coupled by a second driving chain 475 to drive a second follower gear 476 formed on a lower blade unit 30 positioned under the uppermost shaft 31. The second driving gear 474, second chain 475 and second follower gear 476 are made to be plural sets as shown in FIG. 1 so that the fan blades 32 or 33 can be synchronously rotated by the driving motor 45, as driven by the first driving gear 471, first chain 472, and first follower gear 473. The lower driving motor 45a, lower coupling 46a and lower driving means 47a are respectively equivalent to the upper motor 45, upper coupling 46 and the upper driving means 47.

Figures 4, 5:
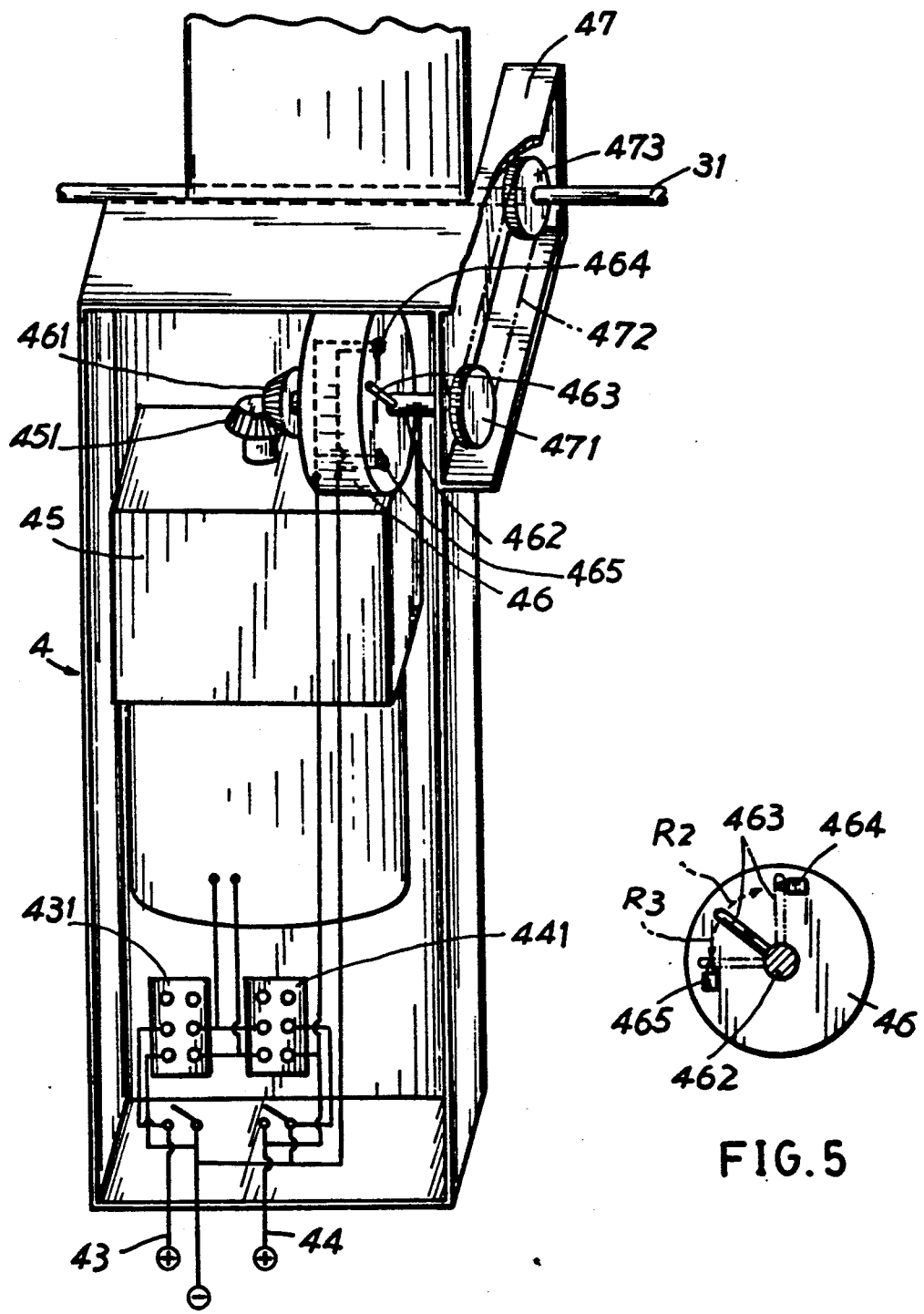
FIG. 4 further shows the wind-receiving restoring means of the present invention.
FIG. 5 is an illustration showing a rotation controlling of a clutch coupling of the restoring means.
Figure 10:
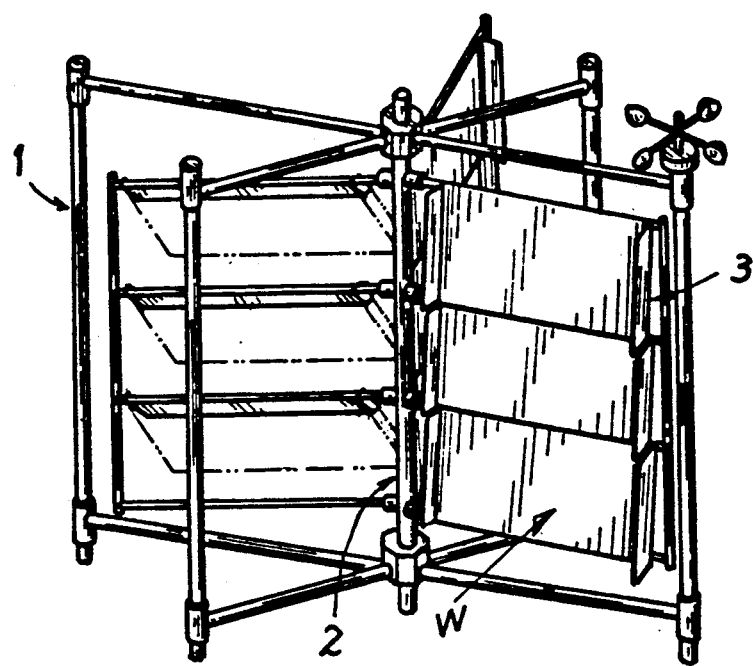
FIG. 10 shows a prior patent also disclosed by this applicant.

The first forward-rotation contact 43 is operatively depressed by the pusher plate 414 of the tracking means 41 to actuate a forward-rotation electromagnetic switch 431 for forwardly rotating the driving motor 45 as shown in FIG. 4 and 3, whereas the first reverse-rotation contactor 44 is depressed by the pusher plate 414 to actuate a reverse-rotation switch 441 for reversely rotating the driving motor 45.

The clutch coupling 46 further includes a clutching bar 463 radially fixed on the output shaft 462, a forward-rotation stopping micro-switch 464 formed on the clutch which is normally closed for a forward rotation of the driving motor 45 and driving means 47, and operatively switched off when depressed by the bar 463 as forwardly rotated (direction R2), and a reverse-rotation stopping micro-switch 465, separated from said micro-switch 464 at a right angle, which is normally closed for a reverse rotation of the motor 45 and driving means 47, and operatively switched off by the bar 463 as reversely rotated (direction R3) as shown in FIG. 5.

In operating the present invention, the vertical fan blade 32 of the upper blade combination 3a is first subject to a wind force (W) as shown in FIG. 6 to rotate in direction R1 to drive the vertical shaft 2 and also drive the lower combination 3b rotating the direction R1 for generating power through the generator 5. The tail blade 411 is aligned with the wind direction as blown the by the wind.

When the upper blade 32 is blown towards the leeward as shown in FIG. 7, the first forward-rotation contactor 43 is also rotated to be depressed by the pushed plate 414 of the wind tracking means 41 to actuate the forward-rotation electromagnetic switch 431 to start a forward running of the driving motor 45 as shown in FIGS. 4 and 1, thereby rotating the shaft 31 in direction R2 to feather the vertical blade 32 to be horizontal as shown in dotted line of FIG. 7 and the horizontal blade 33 is now rotated to be a vertical blade on the windward ready for receiving wind force. Meanwhile, the lower vertical blade 32 is subject to wind force to continuously rotate the shaft 2 in direction R1.

As shown in FIG. 8, the upper blades are further rotated by a quadrant from FIG. 7 to drive the lower blade 32 towards the leeward whereby the second forward-rotation contactor 43a is depressed by the pusher plate 414 to forwardly rotate the driving motor 45a, lower driving means 47a to rotate the vertical fan blade on leeward to be horizontal as shown in dotted line and to erect the left-leaf blade on the windward to be vertical ready for receiving wind force for its further rotation.

In FIG. 9, the left-leaf horizontal blade is now rotated towards the windward and the reverse-rotation contactor 44 is depressed by the pusher plate 414 to actuate the reverse-rotation switch 441 so as to drive the motor 45 in a reverse rotation to rotate the shaft 31 in direction R3 to restore the horizontal blade to be vertical at windward and feather the vertical blade on leeward for a continuous running of the present invention.

During a forward rotation (R2), the clutching bar 463 is forwardly rotated to actuate the stopping contactor 464 to stop the rotation of shaft 31 to rotate the fan blade at a right angle. When reversing the motor running, the bar 463 is reversely rotated to actuate the stopping contactor 465 so as to reversely rotate the blade at a right angle as shown in FIG. 5.

The present invention is superior to my earlier patented windmill with the following advantages:

1. When the vertical blade is rotated towards the leeward, the restoring means 4 will automatically feather the vertical blade to be horizontal to reduce wind resistance during its leftward rotation, whereas the horizontal blade when rotated towards the windward will be erected to be vertical by the restoring means 4 ready for fully receiving the wind force at its rightward rotation so that this invention can efficiently "catch" the wind energy, but reduce the wind resistance.

The frequency impact force acting on the fan blades of a conventional windmill causing noise and damages of the equipments will be overcome in this invention due to the reduction of wind resistance.

The electric energy to rotate the driving motor 45, 45a of this invention is quite little since the rotation of the shaft 31 is very smooth by a symmetric load of the two blades 32, 33 respectively disposed on two opposite sides of the central shaft 2. The electric energy of the power source 40 may be self supplied by the generator 5 after its normal running. The start-up of the motor 45 may be driven by the power source of an automatically recharging battery which is always charged by the power generator 5.

I claim:

1. A self-restored windmill comprising:
   a supporting frame having a plurality of vertical columns and plurality of sets of horizontal bracing rod cross, each set of bracing rod cross horizontally secured by the columns;
   a central vertical transmission shaft rotatably mounted in the plural sets of horizontal bracing rod cross;
   a fan blade means including an upper blade combination and a lower blade combination, each blade combination having a plurality of fan blade units, each unit having a horizontal blade shaft pivotally mounted in the central transmission shaft, a right-leaf vertical fan blade vertically fixed to a right portion of the horizontal shaft on a right side of the central transmission shaft, and a left-leaf horizontal fan blade horizontally fixed to a left portion of the horizontal shaft on a left side of the transmission shaft projectively perpendicular to said vertical fan blade, said upper blade combination being projectively separated from said lower blade combination at a right angle;

a wind-receiving restoring means operatively feathering the vertical fan blade of the fan blade means on the leeward at its leftward rotation towards windward, and restoring the horizontal fan blade to be vertical and ready for receiving wind force at its rightward rotation towards leeward; and a power generator formed on a lower portion of the supporting frame driven by said transmission shaft;

said wind-receiving restoring means including: a wind-direction tracking means having a steering tail blade operatively aligned with a blowing wind direction, an actuating distributor having a first forward-rotation contactor formed on a right side portion of the distributor and a first reverse-rotation contactor formed on a left side portion of the distributor and a second forward-rotation contactor formed on a front side portion of the distributor and a second reverse-rotation contactor formed on a rear side portion of the distributor, an upper driving motor being capable of forwardly rotating a horizontal shaft of a fan blade unit of the upper blade combination through an upper clutch coupling and an upper driving means as actuated by said first forward-rotation contactor and said upper driving motor being capable of reversely rotating the horizontal shaft as actuated by said first reverse-rotation contactor, and a lower driving motor operatively rotating a horizontal shaft of a fan blade unit of the lower blade combination through a lower clutch coupling and a lower driving means, either forwardly as actuated by the second forward-rotation contactor, or reversely as actuated by the second reverse-rotation contactor.

2. A windmill according to claim 1, wherein said wind-direction tracking means includes: a steering tail blade secured to a vertical stem orientating in a direction aligned with said wind direction, a hollow cylindrical base rotatably mounted on a central protrusion of the distributor having said vertical stem formed on said cylindrical base, and a pusher plate protruding outwardly and downwardly to rotatably actuate said plural contactors on said distributor.

3. A windmill according to claim 1, wherein said actuating distributor includes: a central protrusion, a cylindrical body formed under the central protrusion having said plural contactors circumferentially formed on the cylindrical body to be operatively depressed by a pusher blade of said wind tracking means, and a pair of electric conductive rings annularly disposed around said cylindrical body respectively powered by a power source.

4. A windmill according to claim 1, wherein said driving motors include a motor shaft operatively coupling an input shaft of said clutch coupling, said clutch coupling having an output shaft operatively coupling the input shaft for operating the driving means and the fan blade unit.

5. A windmill according to claim 1, wherein said driving means include a first driving gear secured on an output shaft of said clutch coupling, a first follower bear secured on a right side of a first horizontal shaft of the fan blade unit, a first driving chain coupling said first driving gear and first follower gear, a second driving gear formed on a left side of said first horizontal shaft, a second follower gear formed on a second horizontal shaft under said first shaft, and a second driving chain coupling said second driving gear and second follower gear, whereby upon a rotation of said driving motor, plural horizontal shafts of the fan blade units will be synchronously rotated.

6. A windmill according to claim 1, wherein said clutch coupling further includes a clutching bar radially fixed on an output shaft, a forward-rotation stopping micro-switch formed on said clutch operatively actuated by said clutching bar to uncouple the output shaft from an input shaft of the coupling to stop a forward rotation of said driving motor, and a reverse-rotation stopping micro-switch formed on said clutch separated from said forward-rotation micro-switch at a right angle for uncoupling said input and said output shafts to stop a reverse rotation of the motor.

* * * * *